United States Patent Office 3,564,566
Patented Feb. 16, 1971

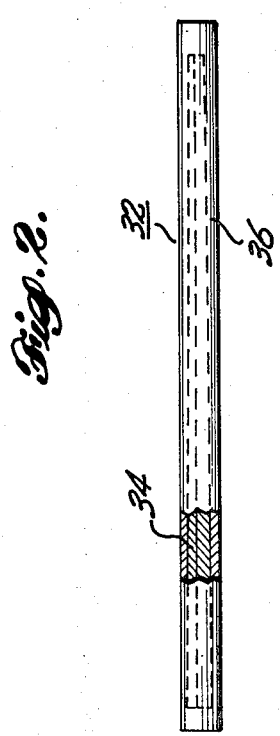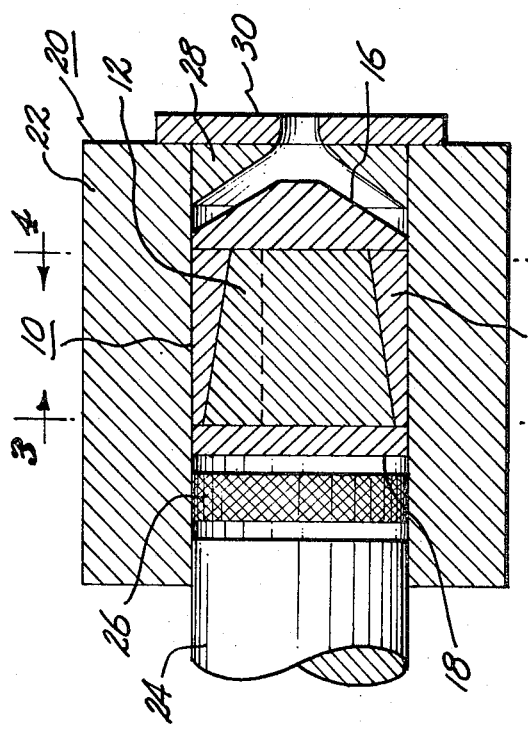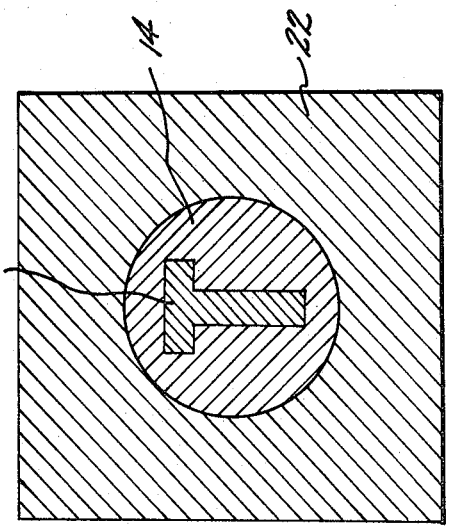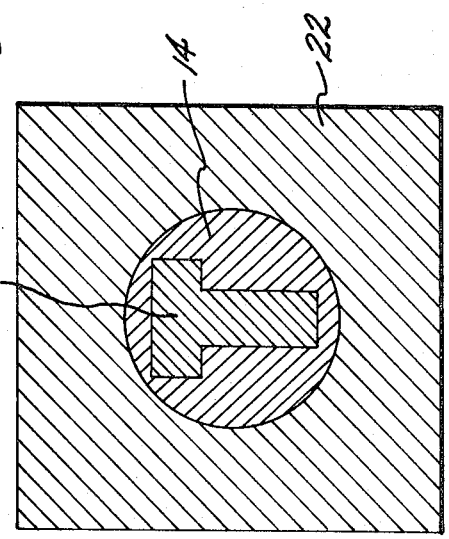
INVENTOR
GEORGE H. HEITMAN
ATTORNEY

3,564,566
PROCESS AND FABRICATION OF TAPERED TITANIUM AND/OR OTHER ALLOY EXTRUSIONS
George H. Heitman, Shrewsbury, Mass., assignor to The Boeing Company, Seattle, Wash., a corporation of Delaware
Filed Nov. 26, 1968, Ser. No. 779,047
Int. Cl. B23p 17/00
U.S. Cl. 29—423                2 Claims

ABSTRACT OF THE DISCLOSURE

A preformed longitudinally tapered structural shape such as a T section, a Z section, a round bar, etc., is encased in the core of a dissimilar material. The encasement is extruded, after which the encasing material is removed to leave a tapered T or Z, etc. shape dependent upon the shape of the preform.

---

The aircraft industry utilizes large tapered structural members in high performance aircraft. The tapered members are very important as a weight saving means. The present day and foreseeable future aircraft call for large tapered structural members, some of which are up to seventy-five feet long. Normally these members would be fabricated starting with a constant section in the desired shape such as a T, Z, J, H, etc. and machine tapering longitudinally to obtain the finished shaped. This machining is very expensive as it requires extra large milling equipment, extensive machine time, and yields a high percentage of metal "chips."

This invention discloses a new and novel solution to obtaining longitudinally tapered structural members with a minimum of machining or with no machining required.

The invention discloses a preform which, when extruded, gives the desired finished shape. The longitudinally tapered preform, during extrusion, has its cross sectional dimensions reduced by the square root of the reduction ratio and it is elongated by the number of times of the reduction ratio to form a longitudinally tapered finished shape. Control of the preform and selection of the reduction ratio determines the finished shape. The preform may be tapered along its entire length. It may have part of the preform with constant cross section and part of it tapered. It may have raised areas along the constant section or along the tapered section to give increased strength as desired. It may be sculptured. All of the above preforms serve to illustrate, but not to limit the scope of this invention.

The preformed shape may be obtained by any of several means such as, but not limited to, machining, extruding, casting, and forging. The preferred method for high strength structural members is to machine a shaped forged billet. A cast preform without any machining is preferred when strength requirements permit.

This invention is especially useful for, but not limited to, the production of tapered titanium shapes. Titanium is difficult to machine and the chip costs are high.

Substantial savings on machine time and the smaller size mill required to produce large tapered structural shapes by this method result in substantial savings.

The preformed shape is extruded by the use of a filled billet extrusion method. The filled billet method, which has been known for several years, comprises encasing the preform in a dissimilar material to form a filled billet. That billet is extruded using conventional equipment after which the encasing material is removed by mechanical or chemical means to leave the finished extrusion. The filled billet method has the advantages of permitting extrusion of materials which gall and therefore abrade forming dies and those which have uneven metal flow between the center and surface of the billet due to surface friction. The use of this invention in combination with the filled billet method gives the added advantage of obtaining tapered extrusions while using a non-movable die.

Using the filled billet method, and in accordance with this invention, the longitudinally tapered preform is encased in the core of a dissimilar material, which preferably will be mild steel. The encasing material will be shaped such as to give a close tolerance fit around the preform. A cross section of the encasing material must be large enough to completely surround the preform, and its outside surface will be symmetrical about a center point. It may be a bar of any of several shapes such as circular, square, pentagon, hexagon, octagon, etc. with a circular shape preferred.

The core may be formed by any of several means. One preferred means is bisecting the bar lengthwise, machining the two halves, inserting the preform, and welding the two halves together, then welding mild steel end plates to the bar. Another preferred embodiment is centering the preform in a hollow bar such as a hollow cylinder, closing off one end of the cylinder, filling the void with metal shot or metal powder under pressure and closing off the other end.

The encased tapered preform makes up the filled billet which is extruded through a stationary die means shaped the same as the encasing bar. The invention, when used in conjunction with the fillet billet method of extruding, yields a tapered shape or a sculptured and tapered shape by the use fo a non-movable die.

Once the preform is extruded into the final shape the encasing material is removed by mechanical or by chemical means and preferably it will be by chemical pickling.

Sometimes it is necessary to chem-mill the finished shape to remove any alloy formed between the preform and the encasing material during the extrusion process.

It may sometimes be necessary to do a limited amount of machining on the finished shape.

OBJECTS

It is an object of this invention to form large size tapered structural shapes with a minimum of machining.

It is a further object of this invention to form long, large size tapered structural shapes without requiring long bed milling equipment.

It is another object of this invention to effect a cost saving in the fabrication of tapered structural members.

It is yet another object of this invention to form large size tapered titanium structural members.

Yet another object of this invention is to obtain longitudinally tapered extrusions while using a non-movable die.

Still another object of this invention is to obtain sculptured, esthetic and/or structural members.

Further objects will be apparent with the detailed description of this invention.

IN THE DRAWINGS

FIG. 1 is a side elevation in section showing the preform as part of the filled billet prior to extrusion.
FIG. 2 is a side view of the extruded filled billet.
FIG. 3 is a view along line 3—3 of FIG. 1.
FIG. 4 is a view along line 4—4 of FIG. 1.

DETAILED DESCRIPTION

In this embodiment, a filled billet 10 includes a longitudinally tapered titanium preform 12, which has been machined from a titanium T shaped forged billet, and said preform is encased in a cylindrical shaped mild steel bar 14, leading edge plate 16, and trailing edge plate 18.

The filled billet 10 is extruded to form an extruded filled billet 32 which includes an extruded preform 34 and an extruded encasing bar 36.

The tapered preform 12 is machined from a titanium T shaped forged billet. The preform is encased in a mild steel cylindrical shaped bar 14. That bar is bisected with a lengthwise cut. The inside of each half is machined so that when the two halves of the bar are placed around the preform it will have a close tolerance fit. The bar is welded together with the tapered preform inside. End plates are then welded to the encasement bar to completely encase the tapered preform and thereby form the filled billet 10. The leading edge end plate 16 is tapered to facilitate the initial phase of extruding, and the trailing end plate 18 has a flat surface to give a vertical contact surface with the short cylindrical shaped graphite cut off ring 26.

The filled billet 10 is extruded through extruding equipment 20 which is comprised of heated extrusion liner 22, ram 24, graphite cut off ring 26, cone 28, and die 30.

The filled billet 10 is inserted in the heated extrusion liner 22 which has a cylindrical shaped cavity running horizontally through the liner. In this embodiment, the filled billet and all areas of the extruding means in contact with it are heated and maintained at 1750° F. The ram 24 is activated by a power source, not shown, and moves against the graphite cut off ring 26 which acts against the filled billet which due to the heat and pressure is forced through cone 28 thence through die 30 to form the extruded filled billet 32. The extruded billet is immersed in a pickling vat containing dilute nitric acid where the mild steel is removed to leave a longitudinally tapered T shaped titanium structural member.

The information set out in the specification is for purposes of illustration and many variations can be made by one skilled in the art without departing from the spirit and scope of this invention as set forth in the claims.

I claim:

1. A process for extruding tapered shapes, the steps comprising:
   (a) preparing a tapered preform,
   (b) encasing the tapered preform with a dissimiliar material to form a filled billet,
   (c) extruding the filled billet and removing a tapered extrusion from the encasing material.

2. A process as in claim 1 wherein the tapered preform has raised areas.

References Cited

UNITED STATES PATENTS

| | | | |
|---|---|---|---|
| 2,231,336 | 2/1941 | Heron | 72—260 |
| 2,530,669 | 11/1950 | Thornton et al. | 72—260 |
| 2,653,494 | 9/1953 | Creutz | 29—423 |
| 2,748,934 | 6/1956 | Wheeler | 72—260 |
| 2,836,884 | 6/1958 | Graham | 29—423 |
| 3,205,692 | 9/1965 | Kemppinen et al. | 29—423X |

JOHN F. CAMPBELL, Primary Examiner

V. A. DI PALMA, Assistant Examiner

U.S. Cl. X.R.

72—258, 260